United States Patent
Lee et al.

(10) Patent No.: US 10,795,988 B2
(45) Date of Patent: Oct. 6, 2020

(54) DEVICE AND METHOD OF REQUESTING EXTERNAL DEVICE TO EXECUTE TASK

(71) Applicant: Samsung Electronics Co., Ltd., Suwon-si, Gyeonggi-do (KR)

(72) Inventors: Jong-hyuk Lee, Suwon-si (KR); Hyok-Sung Choi, Seoul (KR); Myung-jin Eom, Seoul (KR); In-dong Lee, Suwon-si (KR); Jung-kyuen Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 15/041,526

(22) Filed: Feb. 11, 2016

(65) Prior Publication Data

US 2016/0306962 A1 Oct. 20, 2016

(30) Foreign Application Priority Data

Apr. 16, 2015 (KR) ........................ 10-2015-0053769

(51) Int. Cl.
| | |
|---|---|
| G06F 21/00 | (2013.01) |
| G06F 21/53 | (2013.01) |
| G06F 21/56 | (2013.01) |
| H04W 12/02 | (2009.01) |
| G06F 9/54 | (2006.01) |

(52) U.S. Cl.
CPC ............... *G06F 21/53* (2013.01); *G06F 9/54* (2013.01); *G06F 9/544* (2013.01); *G06F 21/566* (2013.01); *G06F 21/567* (2013.01); *H04W 12/02* (2013.01); *G06F 2221/033* (2013.01)

(58) Field of Classification Search
CPC ...... G06F 21/53; G06F 21/566; G06F 21/567; G06F 2221/033; G06F 9/54; H04L 63/1433; H04L 63/1416; H04L 63/145; H04W 12/02
See application file for complete search history.

(56) References Cited

U.S. PATENT DOCUMENTS 8,945,008 B2   2/2015   Takehara et al.
2005/0289264 A1* 12/2005 Illowsky ............... G06F 1/3203
                                                       710/104

(Continued)

FOREIGN PATENT DOCUMENTS

| JP | 2005-128884 A | 5/2005 |
|---|---|---|
| KR | 10-2009-0121016 A | 11/2009 |
| KR | 10-2013-0027157 A | 3/2013 |

OTHER PUBLICATIONS

Felt et al., Android Permissions: User Attention, Comprehension, and Behavior, Feb. 17, 2012.

(Continued)

*Primary Examiner* — Joseph P Hirl
*Assistant Examiner* — Chi D Nguy
(74) *Attorney, Agent, or Firm* — Jefferson IP Law, LLP

(57) ABSTRACT

A first device requesting a second device to execute a task is provided. The first device includes a communication unit configured to communicate with the second device and a processor configured to transmit content for executing the task to the second device through the communication unit as an event for requesting execution of the task is generated, and receive result data obtained as the second device executes the task through the communication unit.

13 Claims, 22 Drawing Sheets

(56) References Cited

U.S. PATENT DOCUMENTS

| | | | |
|---|---|---|---|
| 2006/0041506 A1* | 2/2006 | Mason | G06Q 10/10 |
| | | | 705/42 |
| 2008/0077994 A1 | 3/2008 | Comlekoglu | |
| 2010/0125896 A1 | 5/2010 | Lehew et al. | |
| 2010/0274910 A1 | 10/2010 | Ghanaie-Sichanie et al. | |
| 2013/0060890 A1 | 3/2013 | Lee et al. | |
| 2013/0097706 A1* | 4/2013 | Titonis | G06N 20/00 |
| | | | 726/24 |
| 2013/0318498 A1* | 11/2013 | Mittal | G06F 11/366 |
| | | | 717/124 |
| 2014/0096182 A1 | 4/2014 | Smith | |
| 2014/0115158 A1 | 4/2014 | Bender et al. | |
| 2014/0181533 A1 | 6/2014 | Boivie et al. | |
| 2015/0058629 A1 | 2/2015 | Yarvis et al. | |
| 2015/0082456 A1* | 3/2015 | Eren | G06F 21/57 |
| | | | 726/27 |
| 2016/0028660 A1* | 1/2016 | Weishaupl | G06F 21/606 |
| | | | 709/206 |

OTHER PUBLICATIONS

European Search Report dated Aug. 2, 2019, issued in European Patent Application No. 16780185.1.
Korean Office Action dated Jun. 22, 2020, issued in Korean Application No. 10-2015-0053769.

* cited by examiner

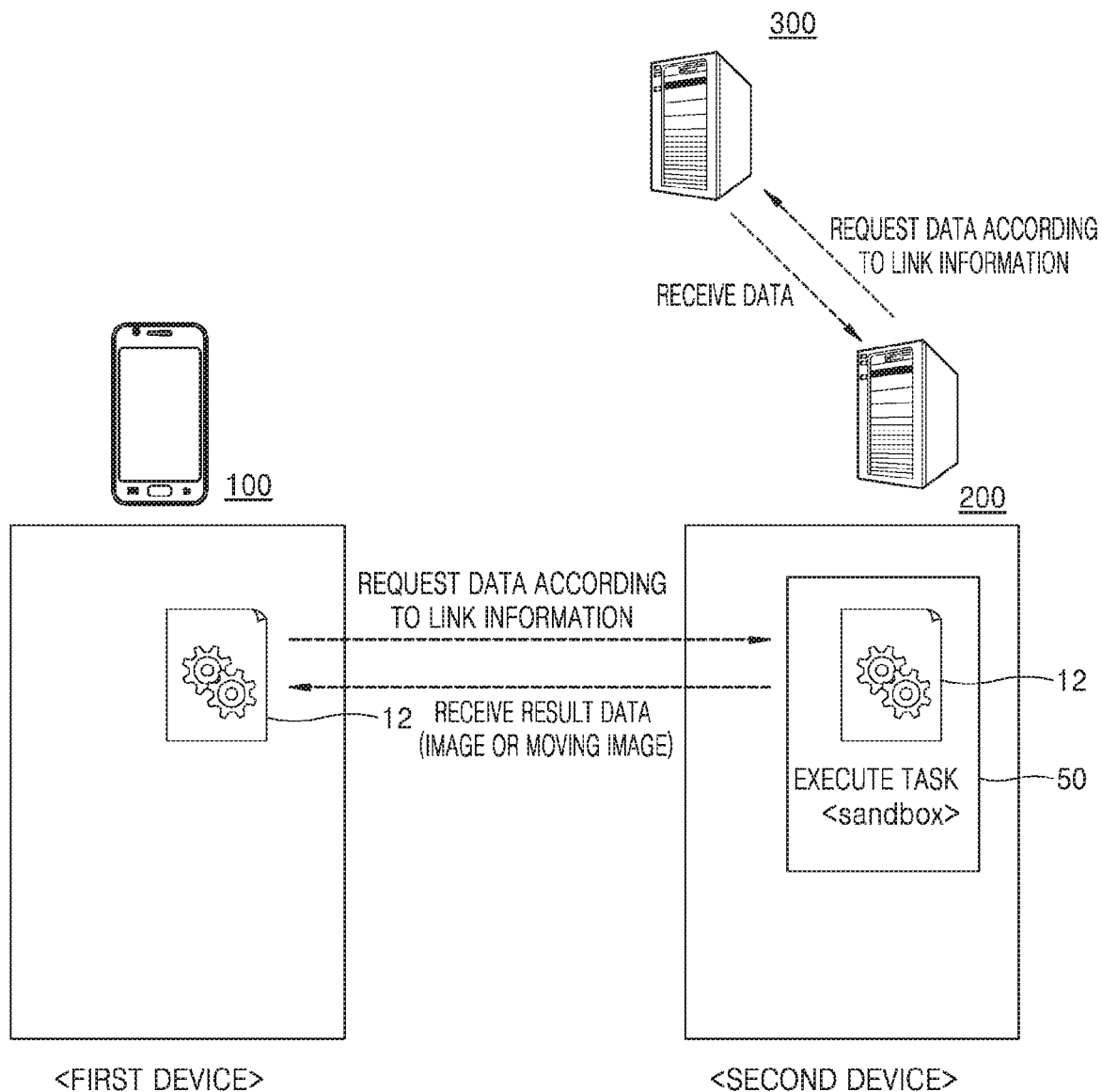

FIG. 8A
FIG. 8B
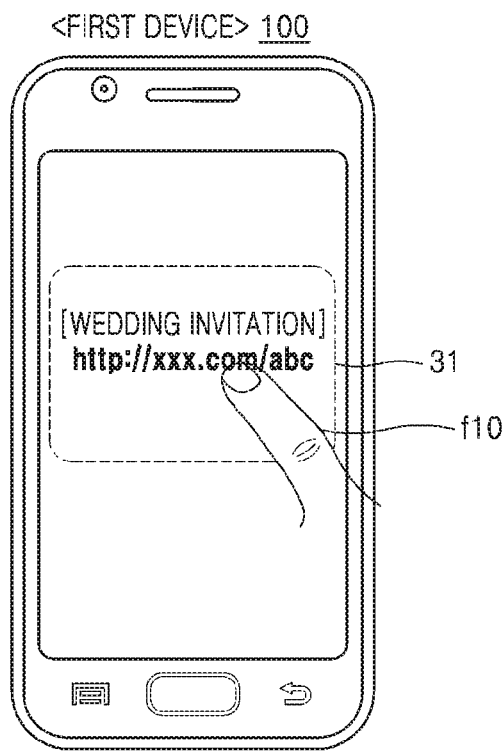
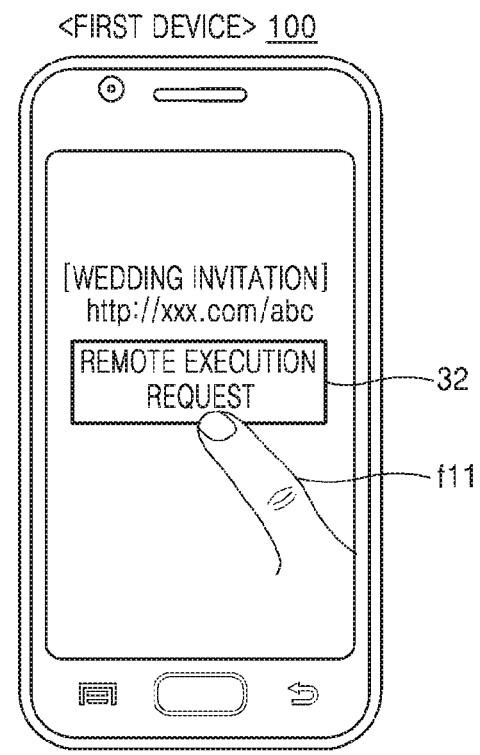

FIG. 14A
FIG. 14B
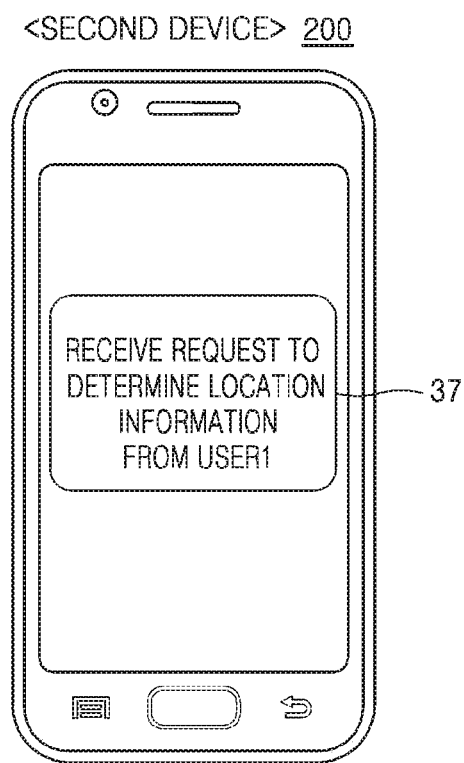
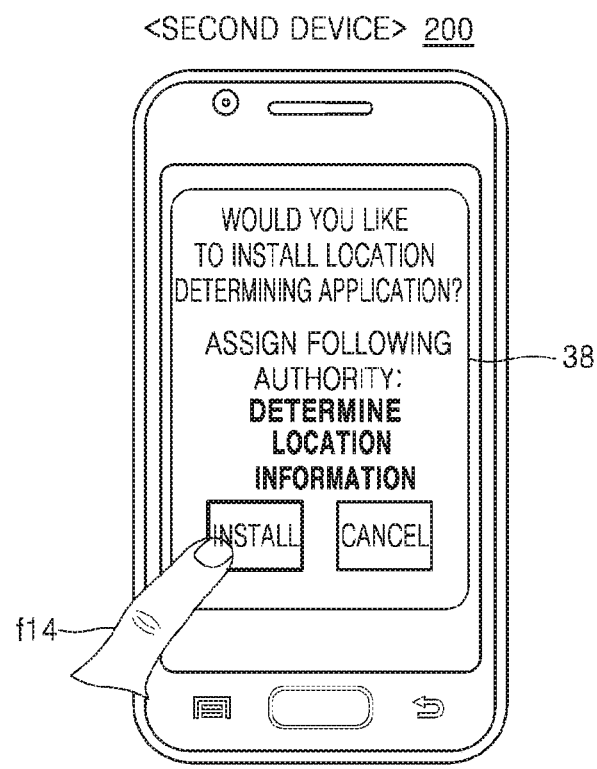

FIG. 18A
FIG. 18B
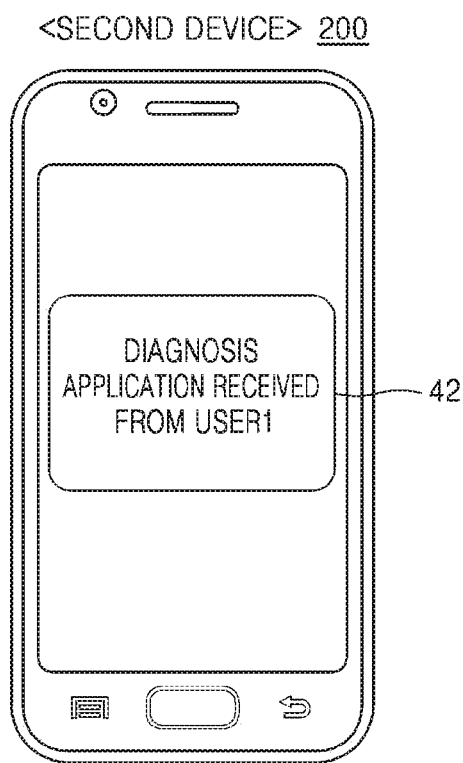
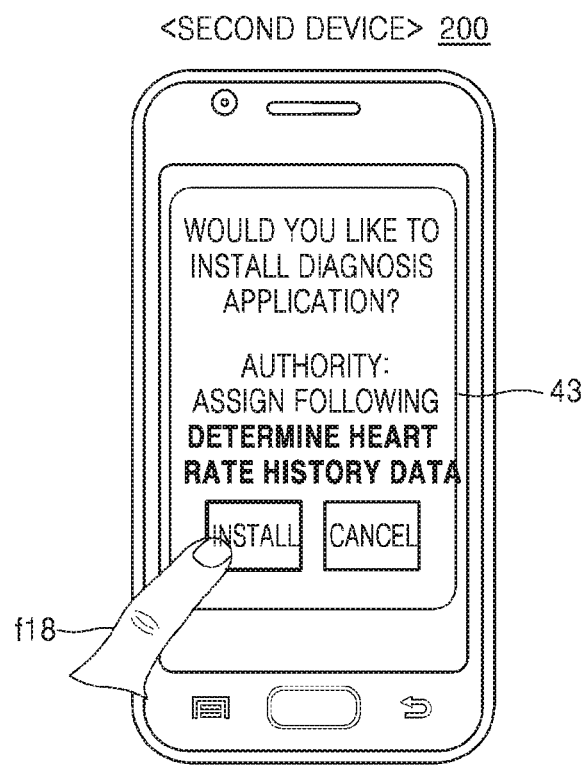

DEVICE AND METHOD OF REQUESTING EXTERNAL DEVICE TO EXECUTE TASK

CROSS-REFERENCE TO RELATED APPLICATION(S)

This application claims the benefit under 35 U.S.C. § 119(a) of a Korean patent application filed on Apr. 16, 2015 in the Korean Intellectual Property Office and assigned Serial number 10-2015-0053769, the entire disclosure of which is hereby incorporated by reference.

TECHNICAL FIELD

The present disclosure relates to a device and method of requesting an external device to execute a task. More particularly, the present disclosure relates to a device and method of requesting an external device to execute a task and receive result data obtained by executing the task.

BACKGROUND

With recent increased Internet access, there is a higher chance of coming into contact with malware that extracts personal information or infects a computer of a user by infiltrating the computer. Also, the user may be wiretapped and sensitive information about the user may be collected when an application is installed in the computer. A program of such malware may provide routes for transmitting a message to another computer or a server and transmitting latent sensitive information.

Accordingly, research into methods of preventing such damage needs to be conducted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method of requesting an external device to execute a task.

Additional aspects will be set forth in part in the description which follows and, in part, will be apparent from the description, or may be learned by practice of the presented embodiments.

In accordance with an aspect of the present disclosure, a first device requesting a second device to execute a task is provided. The first device includes a communication unit configured to communicate with the second device and a processor configured to transmit content for executing the task to the second device through the communication unit as an event for requesting execution of the task is generated, and receive result data obtained as the second device executes the task through the communication unit.

The processor may be configured to transmit access request information of data stored in a memory of the second device to the second device.

The event may include at least one of a request to execute an application, reception of link information, and a request to access data stored in an external terminal.

The content for executing the task may include at least one of an application execution file and link information.

The task may be executed in a protected region on a memory of the second device, wherein access to regions other than the protected region may be restricted while the task is being executed.

The result data may include at least one of information about whether the content is defective and information about a result generated as the task is executed.

In accordance with another aspect of the present disclosure, a second device requested to execute a task by a first device is provided. The second device includes a communication unit configured to communicate with the first device and a processor configured to receive content for executing the task from the first device through the communication unit, execute the task in a protected region on a memory, and transmit result data obtained by executing the task to the first device, wherein access to regions other than the protected region is restricted while the task is being executed.

The processor may be configured to receive access request information of data stored in the memory from the first device.

The processor may be configured to execute the task by using the data based on the access request information.

The processor may be configured to encrypt the result data and store the encrypted result data in the memory.

When the executing of the task is completed, the processor deletes data from the protected region.

In accordance with another aspect of the present disclosure, a method of requesting a second device to execute a task is provided. The method includes transmitting content for executing the task to the second device as an event for requesting execution of the task is generated and receiving result data obtained as the second device executes the task.

The method may further include transmitting access request information of data stored in a memory of the second device to the second device.

The event may include at least one of a request to execute an application, reception of link information, and a request to access data stored in an external terminal.

The content for executing the task may include at least one of an application execution file and link information.

The task may be executed in a protected region on a memory of the second device, wherein access to regions other than the protected region may be restricted while the task is executed.

The result data may include at least one of information about whether the content for executing the task is defective and information about a result generated as the task is executed.

In accordance with another aspect of the present disclosure, a method of receiving a request to execute a task from a first device is provided. The method includes receiving content for executing the task from the first device, executing the task in a protected region on a memory, and transmitting result data obtained as the task is executed to the first device, wherein access to regions other than the protected region is restricted while the task is being executed.

The method may further include receiving, from the first device, access request information of data stored in the memory.

The executing of the task may include executing the task by using the data based on the access request information.

The method may further include encrypting the result data and storing the encrypted result data in the memory.

The method may further include, when the executing of the task is completed, deleting data from the protected region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is a diagram for describing an example of executing a task according to an embodiment of the present disclosure;

FIGS. 8A, 8B, 9A, and 9B are diagrams of examples of a user interface (UI) provided by a device according to an embodiment of the present disclosure;

FIGS. 13, 14A, 14B, and 15 are diagrams of examples of a UI provided by a device according to another embodiment of the present disclosure;

FIGS. 17A, 17B, 18A, 18B, and 19 are diagrams of examples of a UI provided by a device according to another embodiment of the present disclosure.

Throughout the drawings, it should be noted that like reference numbers are used to depict the same or similar elements, features, and structures.

DETAILED DESCRIPTION

Figure 1:
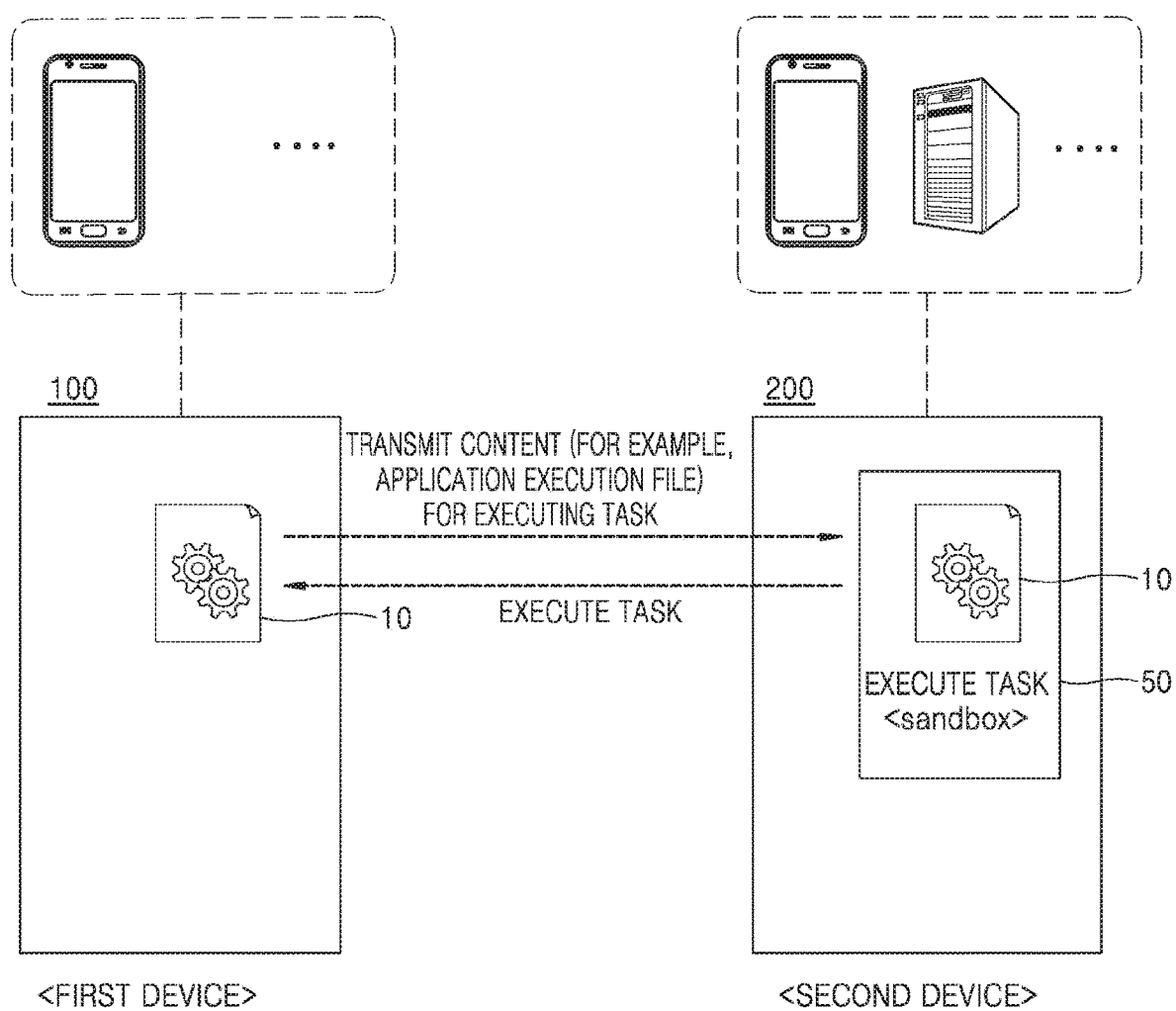
FIG. 1 is a diagram for describing an example according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of one or more embodiments and methods of accomplishing the same may be understood more readily by reference to the following detailed description of the various embodiments and the accompanying drawings. Also, while describing the one or more embodiments, detailed descriptions about related well-known functions or configurations that may diminish the clarity of the points of the present disclosure are omitted. It will be understood that although the terms "first", "second", etc. may be used herein to describe various components, these components should not be limited by these terms. These components are only used to distinguish one component from another.

Hereinafter, a device according to one or more embodiments will be described in detail with reference to accompanying drawings. Terms such as "module" or "unit" are used only for the purpose of ease of preparation of the specification, and thus shall be considered in a broad sense and are not limited to any particular meaning or role.

Examples of a device described herein include a mobile phone, a smart phone, a tablet personal computer (PC), a laptop, a digital broadcasting terminal, a personal digital assistant (PDA), a portable multimedia player (PMP), and a navigation device. However, it will be obvious to one of ordinary skill in the art that configurations according to one or more embodiments may also be applied to a fixed terminal, such as a digital television (TV) or a desktop computer, except for a case when a configuration is applicable only to a mobile terminal.

In the specification, when a region is "connected" to another region, the regions may not only be "directly connected", but may also be "electrically connected" via another device therebetween. Also, when a region "includes" an element, the region may further include another element instead of excluding the other element, otherwise differently stated.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of will be described with reference to accompanying drawings.

FIG. 1 is a diagram for describing an example according to an embodiment of the present disclosure.

According to an embodiment, when it is feared that a virus may attack an application downloaded by a device, the device may request a terminal or a server to execute the application instead, and receive a result obtained by executing the application. Accordingly, the device may prevent damage caused by a virus attack of software suspected to be malware. Meanwhile, the terminal or the server that is requested to execute the application may execute the application in a protected region on a memory that does not affect a system.

Referring to FIG. 1, a first device 100, such as a smart phone, may transmit content 10 (for example, an application execution file) for executing a task to a second device 200, such as a smart phone or a server), and request the second device 200 to execute the task (for example, execute an application).

Figure 2:
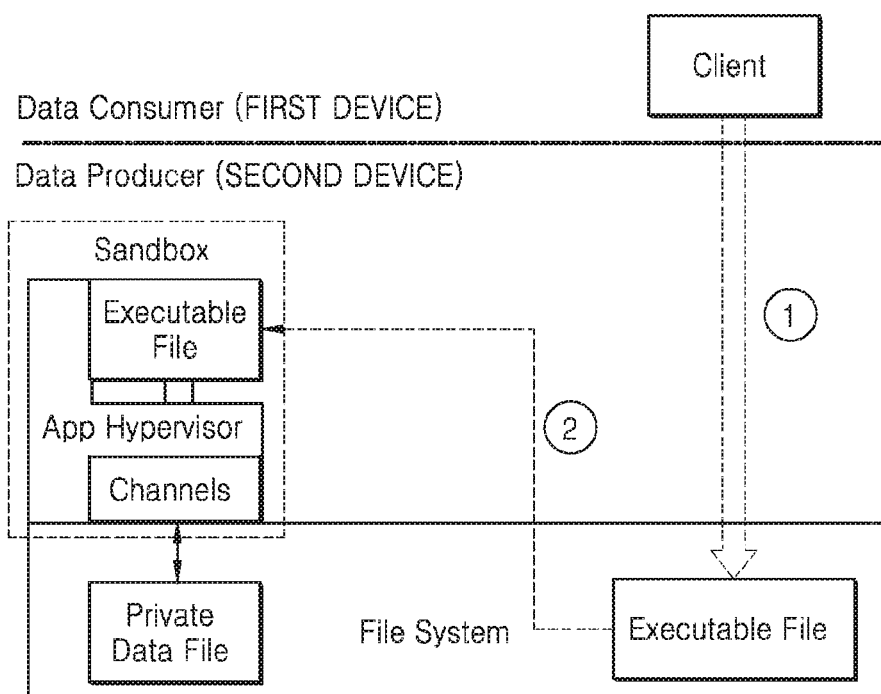
FIGS. 2, 3, and 4 are conceptual diagrams for describing an example of executing a task by using a sandbox according to an embodiment of the present disclosure.
Figure 3:
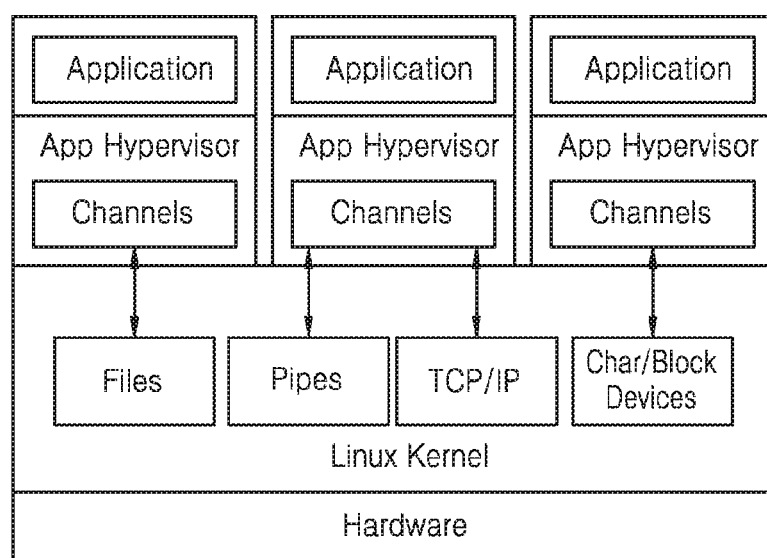
Figure 4:
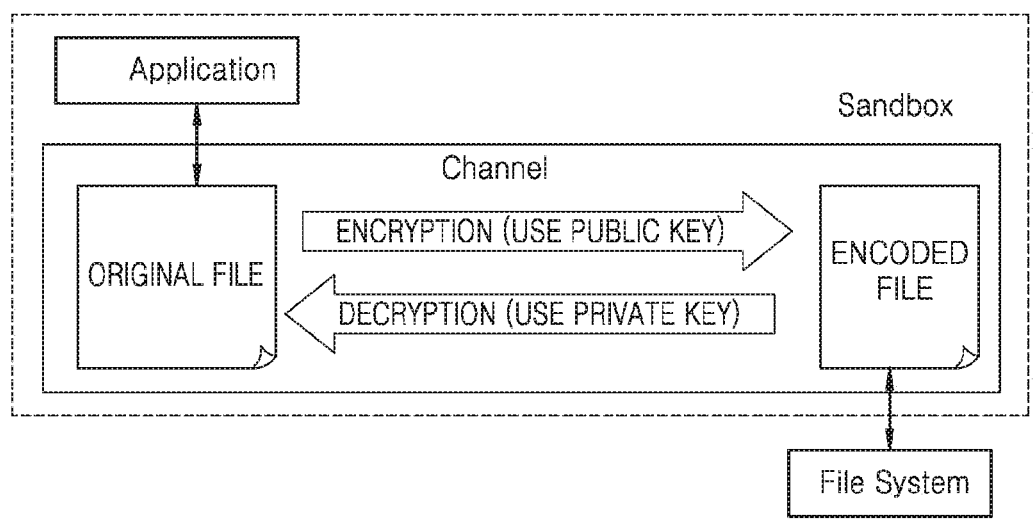

Upon receiving the application execution file, the second device 200 may execute the application in a protected region 50 (hereinafter, also referred to as a 'sandbox'. Refer to FIGS. 2 through 4) on a memory. The second device 200 may transmit result data obtained by executing the application (for example, information about whether the application is infected by a virus and data generated by executing the application) to the first device 100.

Meanwhile, according to an embodiment, when the executing of the task in the protected region on the memory is completed, data in the protected region may all be deleted.

FIGS. 2 through 4 are conceptual diagrams for describing an example of executing a task by using a sandbox according to an embodiment of the present disclosure.

According to an embodiment, a second device that is requested to execute a task may execute the task in a protected region on a memory.

According to an embodiment, a protected region on a memory may be a virtual region managed by a sandbox program. The sandbox program may be security software that confines and executes a program received by a device from an external source or executes a web browser in a protected region. According to the sandbox program, the program executed in a sandbox is unable to read or alter a local file of a device, thereby blocking a malicious virus from penetrating into another memory region. For example, when a computer attempts to access an Internet webpage that is suspected to contain a malicious code or a virus or executes a file suspected to contain a virus or to be a hacking program, the computer may be protected by using the sandbox program.

Referring to FIG. 2, a first device may transmit an application execution file to the second device in operation 1, and the second device may execute the application execution file by transmitting the application execution file to a virtual region protected by a sandbox program, in operation 2. Here, the virtual region protected by the sandbox program may be controlled by an app hypervisor. The app hypervisor may be software that manages an application installed and executed in the virtual region.

Meanwhile, a data producer (the second device) that does not want to share personal data may limitedly allow a data consumer (the first device) that wants to share data to access data instead of providing the data to the data consumer. According to an embodiment, the data producer may receive an application execution file from the data consumer, and allow the data consumer to access a local file (a private data file) in a system of the data producer through a channel under a limited condition.

Also, referring to FIG. 3, the second device may control each application to have an independent virtual execution environment according to control of an app hypervisor. Also, the second device may allow a data file in a system to be limitedly accessible through a channel, according to control of the app hypervisor.

When a plurality of sandboxes are executed, execution independency of different applications may be guaranteed according to independent execution environments controlled by each app hypervisor.

Meanwhile, an app hypervisor may be neutral with respect to an operating system (for example Linux Kernel) driven in a system by being located in a layer higher than the operating system.

Referring to FIG. 4, an application executed in a virtual region protected by a sandbox program may limitedly access a file system through a channel.

Here, a file may be encoded through the channel, thereby reinforcing security on the file.

For example, an encoding method may be an asymmetrical encoding method using an encryption key and a decryption key, which are different from each other, wherein an encoder encodes a file by using a public key and a decoder decodes the encoded file by using a private key.

The file may be encoded by using the public key during file write through the channel, and then stored in a file system, according to control of an app hypervisor. Also, the file may be decoded by using the private key during file read through the channel, according to control of the app hypervisor.

Meanwhile, after the executing of the application is ended, data executed in the virtual space protected by the sandbox program may all be deleted, and the private key used to decode the file may also be deleted.

Figure 5:
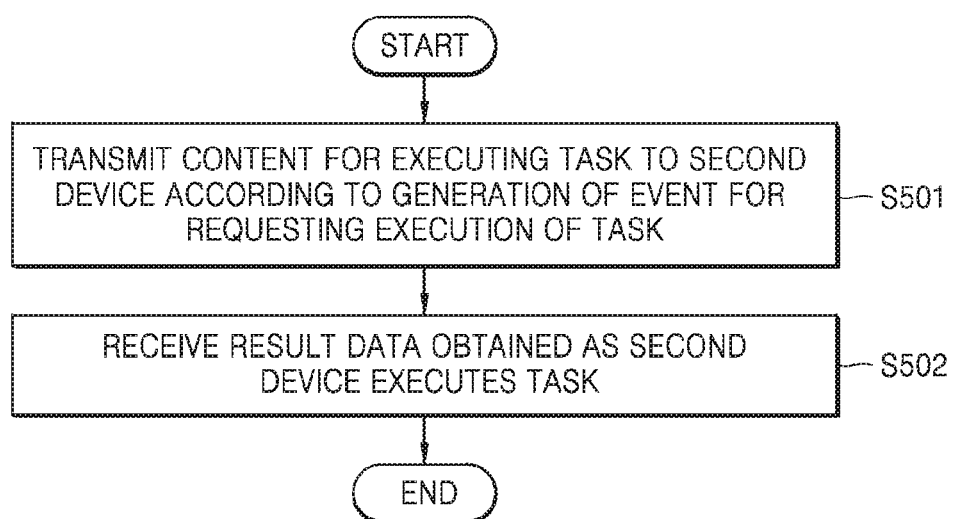
FIG. 5 is a flowchart of a method of controlling a first device according to an embodiment of the present disclosure.

FIG. 5 is a flowchart of a method of controlling the first device 100 according to an embodiment of the present disclosure.

Referring to FIG. 5, the first device 100 requests the second device 200 to execute a task, and receives result data obtained by executing the task.

In operation S501 of FIG. 5, a processor 130 of the first device 100 may transmit content for executing the task to the second device 200 according to generation of an event for requesting execution of the task.

According to an embodiment, the task executed by the second device 200 may include execution of an application or a request for data to a server according to link information.

Also, the event generated by the first device 100 may include a request to execute an application, reception of link information, or a request to access data stored in an external terminal. The event generated will be described below with reference to FIGS. 7, 12, and 16.

Also, the content transmitted from the first device 100 to the second device 200 may include an application execution file or link information.

In operation S502 of FIG. 5, the first device 100 may receive the result data obtained as the second device 200 executes the task.

According to an embodiment, the second device 200 may execute the task in a protected region (a sandbox) on a memory of the second device 200.

According to an embodiment the result data may include information about whether the content is defected (for example, virus information regarding the application execution file) or information about a result generated by executing the task (for example, information about a user location or information about a user diagnosis result).

For example, upon receiving a request to execute a certain application from an external terminal or a server, the first device 100 may request the second device 200 to execute the certain application instead by transmitting an application execution file to the second device 200. Upon receiving the application execution file, the second device 200 may execute the certain application in a protected region on the memory 270, and then transmit result data to the first device 100.

Figure 6:
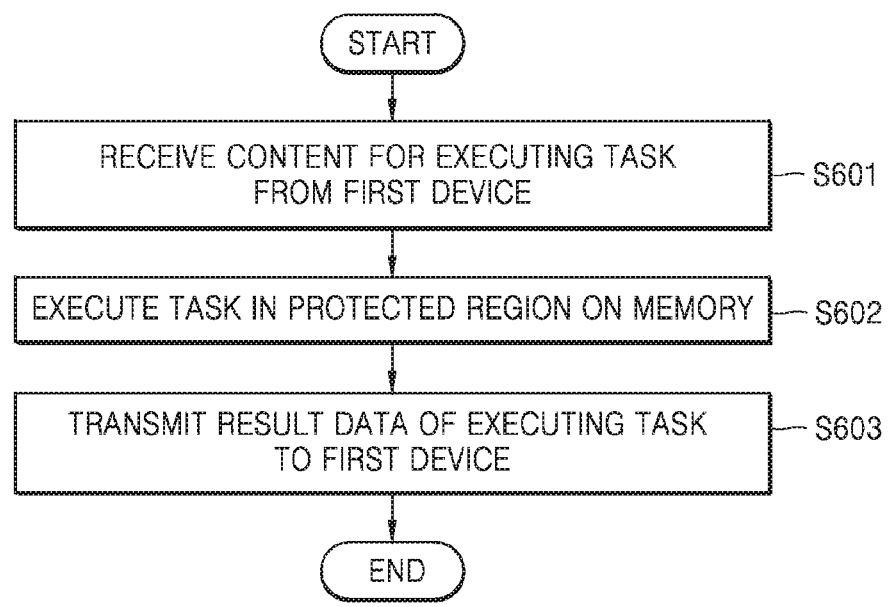
FIG. 6 is a flowchart of a method of controlling a second device according to an embodiment of the present disclosure.

FIG. 6 is a flowchart of a method of controlling the second device 200 according to an embodiment of the present disclosure.

Referring to FIG. 6, the second device 200 is requested to execute a task by the first device 100, and transmits result data obtained by executing the task.

In operation S601 of FIG. 6, the second device 200 may receive content for executing the task from the first device 100. According to an embodiment, the second device 200 may receive an application execution file for executing an application from the first device 100.

In operation S602 of FIG. 6, the second device 200 may execute the task in a protected region on the memory 270. According to an embodiment, the second device 200 may execute the application in a virtual protected region (a sandbox) on the memory 270, in which access of the application execution file to a file system is restricted.

In operation S603 of FIG. 6, the second device 200 may transmit the result data obtained by executing the task to the first device 100. According to an embodiment, the second device 200 may transmit, for example, data generated by executing the application and information about whether the application execution file contains a virus to the first device 100.

Also, according to an embodiment, when the executing of the task in the protected region on the memory 270 is completed, a processor 230 of the second device 200 may delete all data in the protected region.

FIG. 7 is a diagram for describing an example of executing a task according to an embodiment of the present disclosure.

According to the current embodiment, referring to FIG. 7, the first device 100 may transmit uniform resource locator (URL) information 12 requesting for a mobile wedding invitation received from an external server or a terminal to the second device 200 to request the second device 200 to execute requesting for data according to the URL information.

According to an embodiment, the second device 200 may request the external server 300 for data according to the URL information, and receive data corresponding to the URL information. Here, the second device 200 may execute a web browser according to the URL information in a protected region (a sandbox) 50 on the memory 270 that limits system access, and receive data, such as an image file or a moving image file.

Also, according to an embodiment, the second device 200 may transmit the data, such as the image file or the moving image file, received from the external server 300, to the first device 100.

According to an embodiment, when the executing of the ULR information in the protected region on the memory 270 is completed, the processor 230 of the second device 200 may delete all data in the protected region.

FIGS. 8A through 9B are diagrams of examples of a user interface (UI) provided by the first device 100 according to an embodiment of the present disclosure.

The UIs of FIGS. 8A through 9B are displayed on a display unit 121 of the first device 100 requesting a task to be executed.

Referring to FIG. 8A, for example, the first device 100 may receive a text message 31 including URL information of a mobile wedding invitation. The first device 100 may receive a touch input of a finger f10 of a user requesting data according to the URL information.

According to an embodiment, in response to the touch input, the first device 100 may display, on the display unit 121, a screen 32 requesting for remote execution as shown in FIG. 8B. The processor 130 may receive a touch input of a finger f11 of the user selecting a remote execution request.

Figure 9A:

Referring to FIG. 9A, the first device 100 may receive image data of the mobile wedding invitation as result data obtained by the second device 200. The first device 100 may display, on the display unit 121, a screen 33 indicating that the image data is received.

Figure 9B:
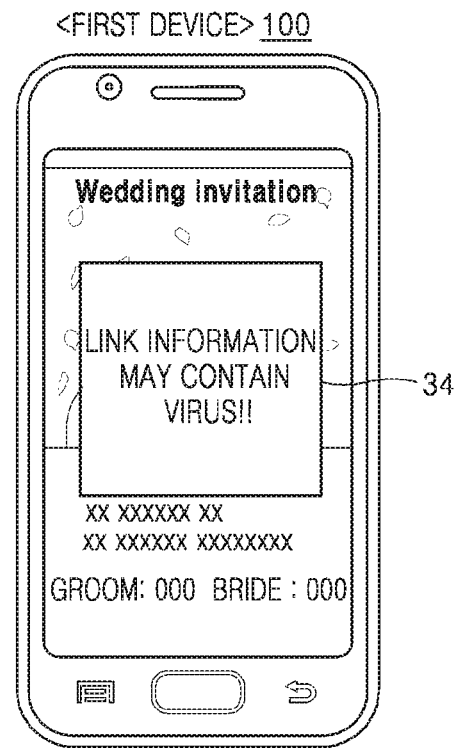

According to an embodiment, referring to FIG. 9B, the first device 100 may receive, as the result data, an alarm message 34 indicating that link information, i.e., the URL information, may contain a virus from the second device 200, and display the alarm message 34 on the display unit 121.

Figure 10:
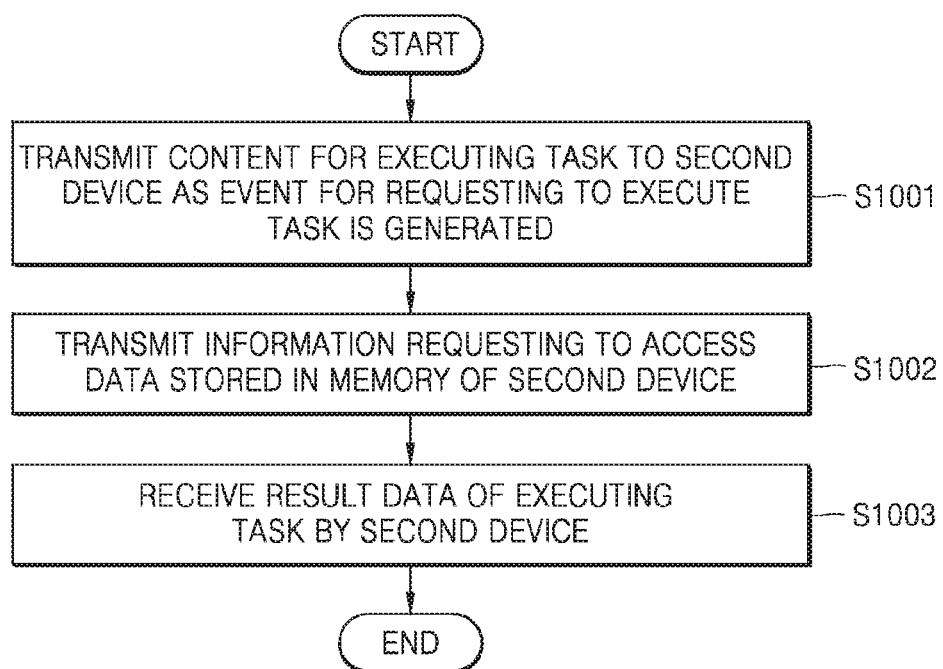
FIG. 10 is a flowchart of a method of controlling a first device according to another embodiment of the present disclosure.

FIG. 10 is a flowchart of a method of controlling the first device 100 according to another embodiment of the present disclosure.

Referring to FIG. 10, when the first device 100 is to access data related to personal information stored in the second device 200, the first device 100 receives result data of executing a task by obtaining temporal permission to access the data from the second device 200.

In operation S1001 of FIG. 10, the first device 100 may transmit content for executing the task to the second device 200 as an event for requesting to execute the task is generated. Since descriptions about operation S1001 have been described above with reference to FIG. 5, details thereof are not provided again.

In operation S1002 of FIG. 10, the first device 100 may transmit information requesting to access data stored in the memory 270 of the second device 200. For example, the first device 100 may want the personal information stored in the second device 200 to be shared, but the second device 200 may not want to share the personal information with the first device 100. In this case, the second device 200 may allow an application received from the first device 100 to limitedly access the personal information, based on the information requesting to access the certain data.

In operation S1003 of FIG. 10, the first device 100 may receive result data of executing the task by the second device 200. According to an embodiment, the second device 200 may execute the application by using the data that is limitedly allowed to be accessed based on the information requesting to access the data, and transmit data processed by executing the application to the first device 100.

Figure 11:
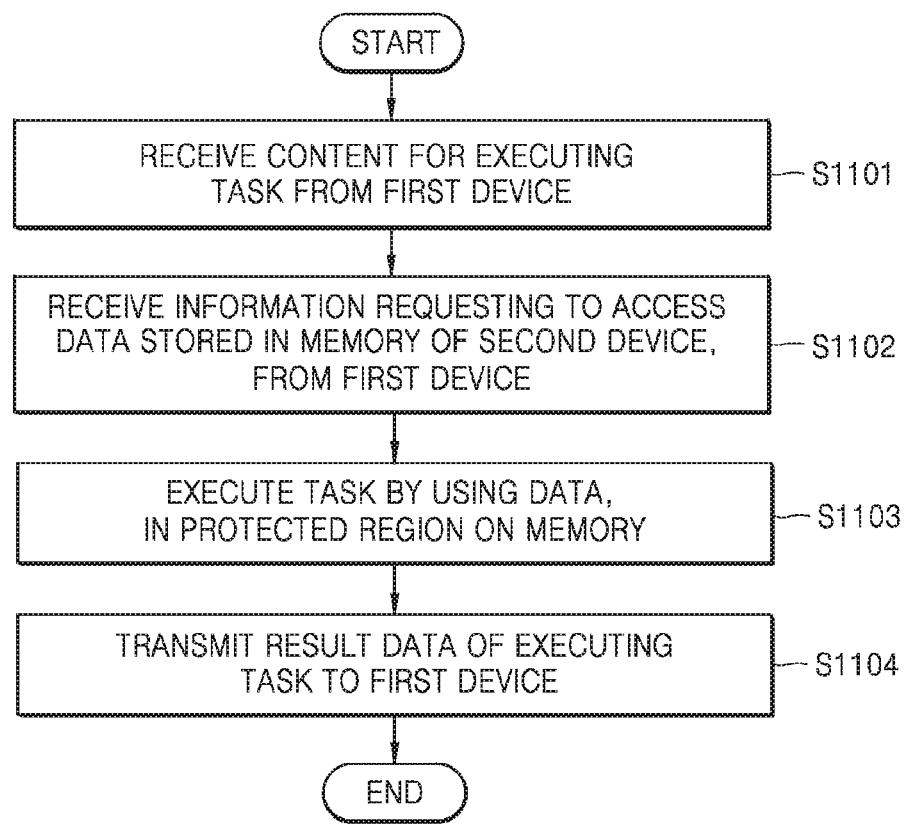
FIG. 11 is a flowchart of a method of controlling a second device according to another embodiment of the present disclosure.

FIG. 11 is a flowchart of a method of controlling the second device 200 according to another embodiment of the present disclosure.

Referring to FIG. 11, the second device 200 executes an application received from the first device 100 by using personal information, and transmits result data of executing the application to the first device 100.

In operation S1101 of FIG. 11, the second device 200 may receive content for executing a task from the first device 100. In operation S1102, the second device 200 may receive information requesting to access data stored in the memory 270 of the second device 200, from the first device 100. In operation S1103, the second device 200 may execute the task by using the data, in a protected region on the memory 270. In operation S1104, the second device 200 may transmit result data of executing the task to the first device 100.

According to an embodiment, the first device 100 wants to access personal information stored in the second device 200, but the second device 200 may not want to provide the personal information to the first device 100. In this case, the second device 200 may isolate and execute an application received from the first device 100 in a protected region (a sandbox) that restricts access of a system, and limitedly allow the first device 100 to access data. Also, the second device 200 may transmit only result data of executing the application to the first device 100.

Also, according to an embodiment, the processor 230 of the second device 200 may delete all data in the protected region after the data is executed in the protected region on the memory 270.

Figure 12:
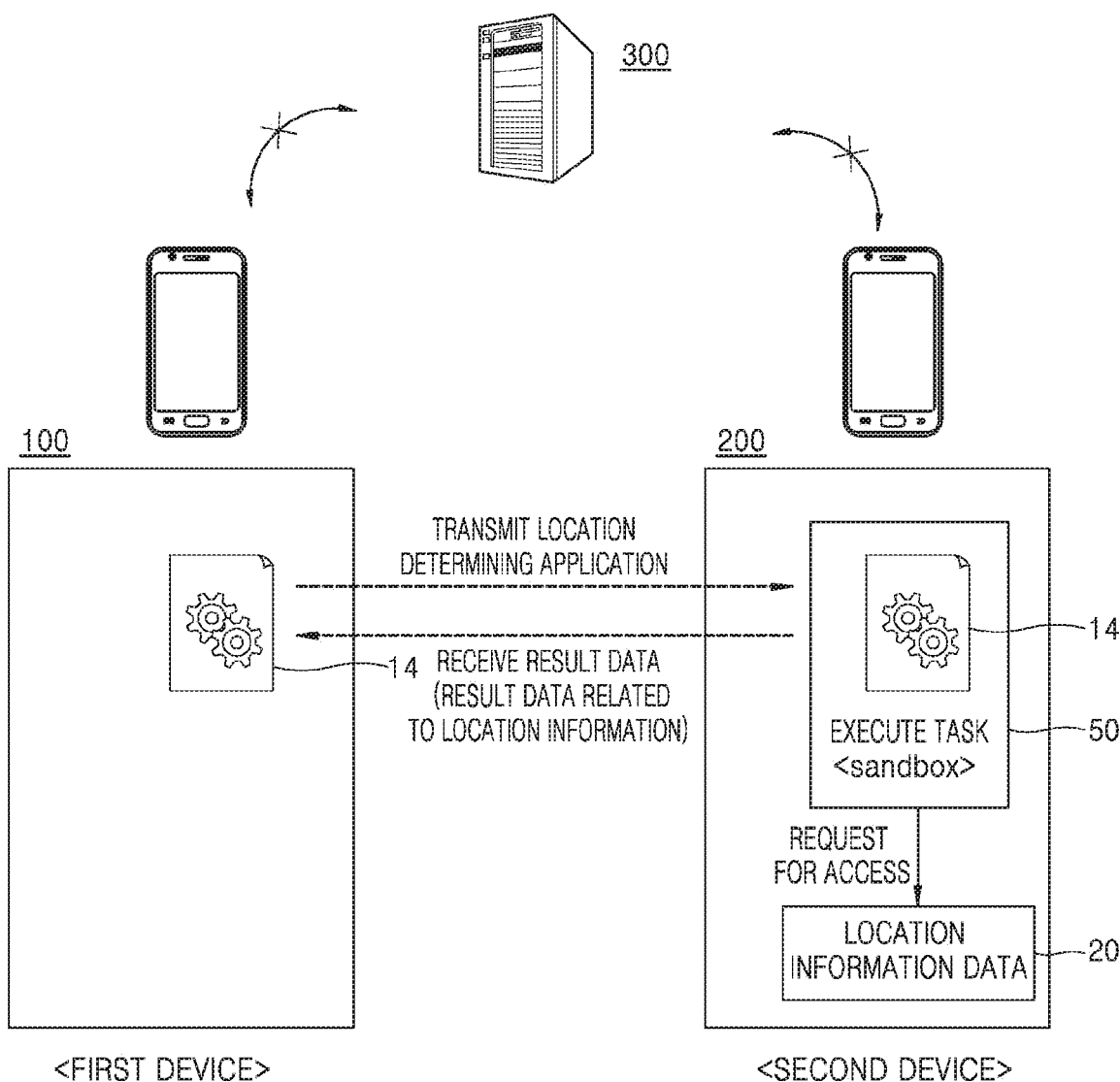
FIG. 12 is a diagram for describing an example of executing a task according to another embodiment of the present disclosure.

FIG. 12 is a diagram for describing an example of executing a task according to another embodiment of the present disclosure.

Referring to FIG. 12, when a location of the second device 200 is to be determined, the first device 100 may transmit a location determining application to the second device 200. At this time, the first device 100 may transmit, to the second device 200, information requesting to access location information data of the second device 200.

According to an embodiment, the second device 200 may execute the location determining application received from the first device 100, in a protected region (a sandbox) on the memory 270 of the second device 200. Here, the second device 200 may execute the location determining application by using the location information data to which access is limitedly allowed, based on the information requesting to access the location information data.

The second device 200 may transmit result data processed as a result of executing the location determining application (for example, a name of a city the second device 200 is located) to the first device 100.

Meanwhile, according to an embodiment, the processor 230 of the second device 200 may delete all data in the protected region when the executing of the location determining application in the protected region on the memory 270 is completed.

According to the embodiment, the first device 100 and the second device 200 may not provide location information to the external server 300 providing a certain location information service. The first device 100 and the second device 200 may transmit and receive data based on location information to and from each other without having to provide information to the external server 300.

Figure 13:
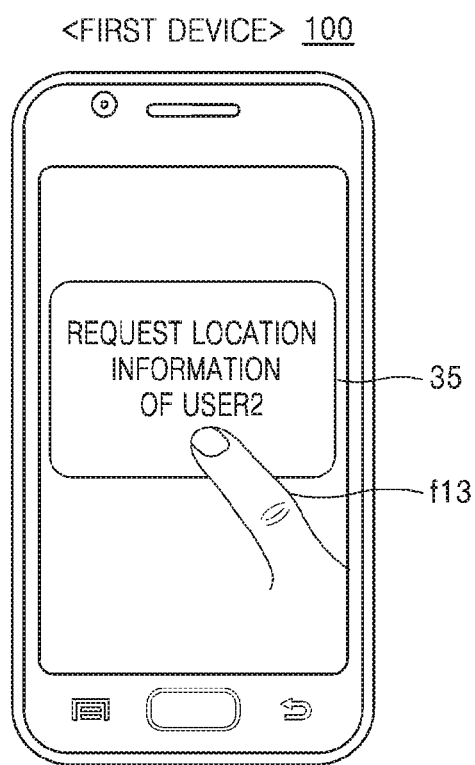
Figure 15:
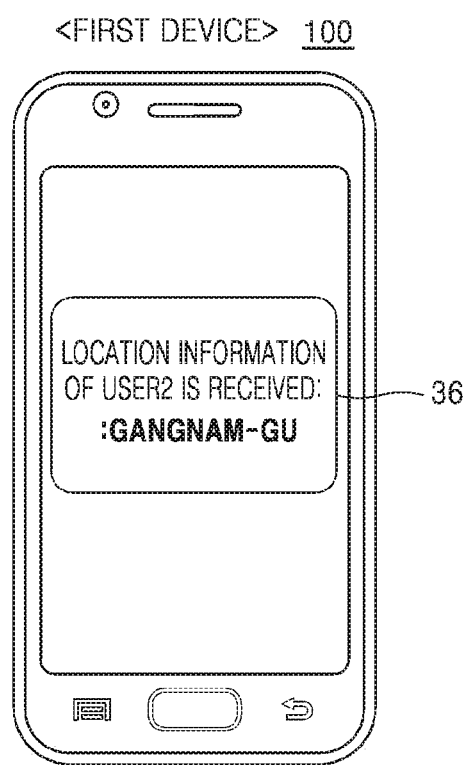

FIGS. 13 through 15 are diagrams of examples of a UI provided by the first and second devices 100 and 200 according to another embodiment of the present disclosure.

FIG. 13 illustrates an example of a UI provided by the first device 100. Referring to FIG. 13, the first device 100 may receive a touch input of a finger f13 of a user selecting a screen 35 requesting for location information of a second user User2.

FIGS. 14A and 14B illustrate examples of a UI provided by the second device 200.

Referring to FIG. 14A, the second device 200 may receive a message 37 requesting to determine location information from an external device, such as the first device 100.

Referring to FIG. 14B, a user may pre-determine information about data to which access is allowed before a location determining application is installed. The second device 200 may display a selection screen 38 requesting a user to allow installation of the location determining application and access to location information of the second device 200. The second device 200 may receive a touch input of a finger f14 of the user allowing the installation of the location determining application and the access to the location information.

FIG. 15 illustrates an example of a screen 36 of the first device 100 displaying result data regarding location information received from the second device 200. According to an embodiment, the first device 100 may receive data processed based on the location information of the second device 200, from the second device 200. For example, the first device 100 may display, on the display unit 121, the screen 36 indicating the location information (for example, 'Gangnam-gu') of the second device 200 received from the second device 200.

Also, according to an embodiment, the second device 200 may provide information matching a pre-set condition to the first device 100. For example, the second device 200 may allow data access when the location information of the second device 200 corresponds to a certain time (for example, location information from three days ago to one day ago) or a certain place (for example, location information of a school, an office, or a house).

Figure 16:
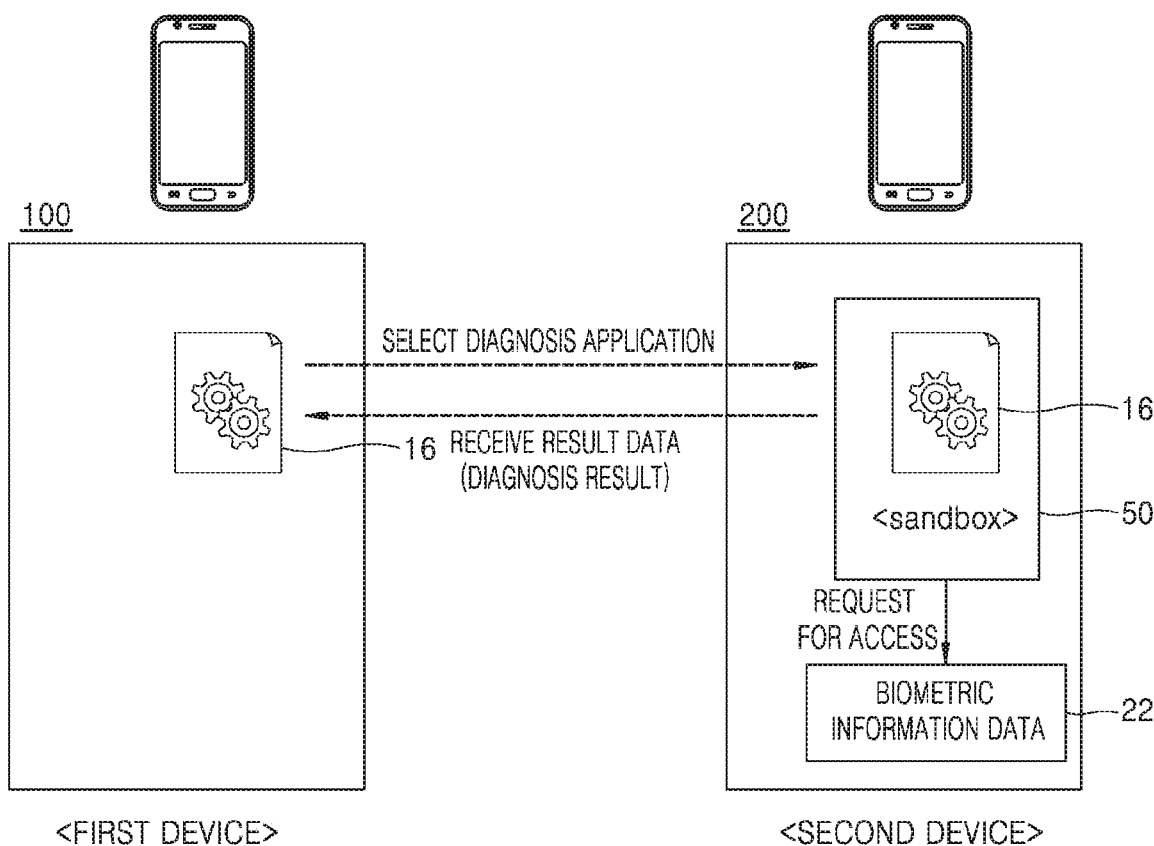
FIG. 16 is a diagram for describing an example of executing a task according to another embodiment of the present disclosure.

FIG. 16 is a diagram for describing an example of executing a task according to another embodiment of the present disclosure.

According to the current embodiment, if a patient does not want to provide personal biometric information data (for example, DNA information, weight information, height information, fingerprint information, or iris information) to a doctor, the patient may provide a diagnosis result using the personal biometric information data instead of providing the personal biometric information data.

According to an embodiment, the first device 100 may transmit a diagnosis application to the second device 200. Also, the first device 100 may transmit request information for accessing biometric information data to the second device 200.

According to an embodiment, the second device 200 may execute the diagnosis application received from the first device 100 in a protected region (a sandbox) on the memory 270 of the second device 200. Here, the second device 200 may execute the diagnosis application by using biometric information data to which access is limitedly allowed, based on the request information received from the first device 100.

The second device 200 may transmit, to the first device 100, result data (for example, a calculation of a risk of a disease or a calculation of a basal metabolic rate) processed as a result of executing the diagnosis application.

Meanwhile, according to an embodiment, the processor 230 of the second device 200 may delete al data in the protected region when the executing of the diagnosis application in the protected region on the memory 270 is completed.

FIGS. 17A through 19 are diagrams of examples of a UI provided by the first and second devices 100 and 200 according to another embodiment of the present disclosure.

Figure 17A:
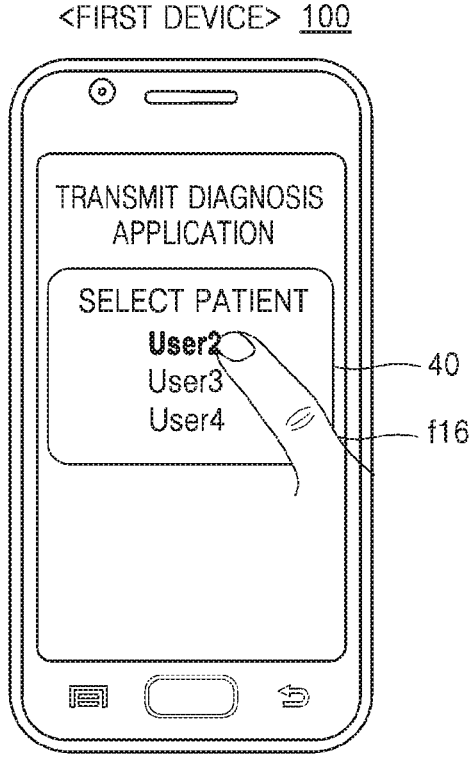
Figure 17B:
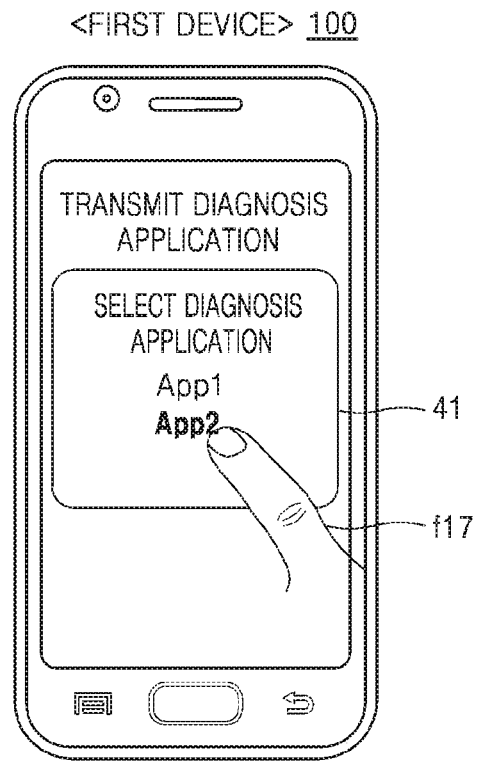

FIGS. 17A and 17B illustrate examples of a UI provided by the first device 100 according to an embodiment of the present disclosure.

Referring to FIG. 17A, the first device 100 (a device of a doctor) may display, on the display unit 121, a screen 40 for selecting a patient to whom a diagnosis application is to be provided, and receive a touch input of a finger f16 of a user selecting the patient (for example, the second user User2).

Also, referring to FIG. 17B, the first device 100 may display, on the display unit 121, a screen 41 for selecting a type of a diagnosis application, and receive a touch input of a finger f17 of the user selecting a diagnosis application App2.

According to an embodiment, the first device 100 may transmit the diagnosis application App2 to a terminal of the patient, for example, the second user User2.

Referring to FIG. 18A, the second device 200 may display a screen 42 indicating that a diagnosis application is received from the first device 100.

Referring to FIG. 18B, a user may pre-determine information about data to which access is allowed before installing the diagnosis application. The second device 200 may display a selection screen 43 requesting the user to allow installation of the diagnosis application and access to biometric information (for example, heart rate history data, waling history data, height data, or weight data) stored in the second device 200. The second device 200 may receive a touch input of a finger f18 of the user allowing the installation of the diagnosis application and the access to the heart rate history data.

Figure 19:
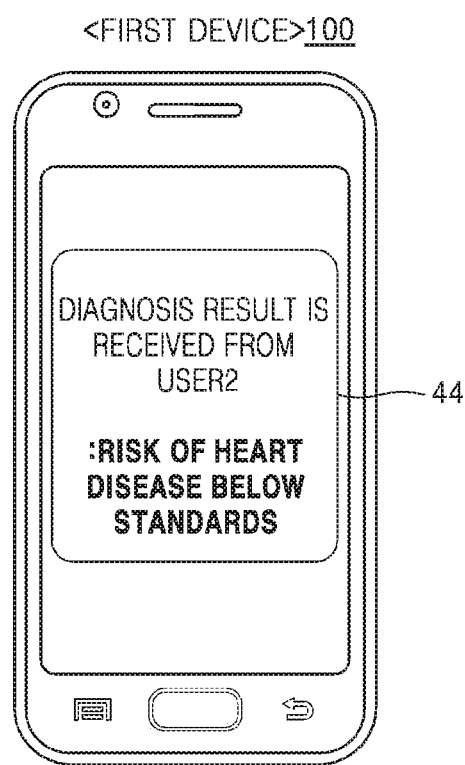

FIG. 19 illustrates an example of a screen 44 of the first device 100 displaying result data regarding diagnosis result information received from the second device 200.

According to an embodiment, the first device 100 may receive data processed based on the biometric information of the second device 200, from the second device 200. For example, the first device 100 may display, on the display unit 121, a screen 44 indicating a diagnosis result (for example, a risk of a heart disease is below standards) of a user of the second device 200 received from the second device 200.

Figure 20:
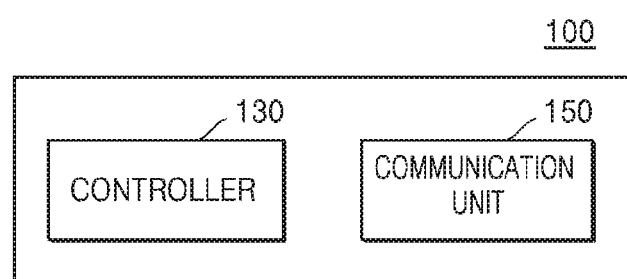
FIGS. 20, 21, and 22 are block diagrams of devices related to an embodiment of the present disclosure.
Figure 21:
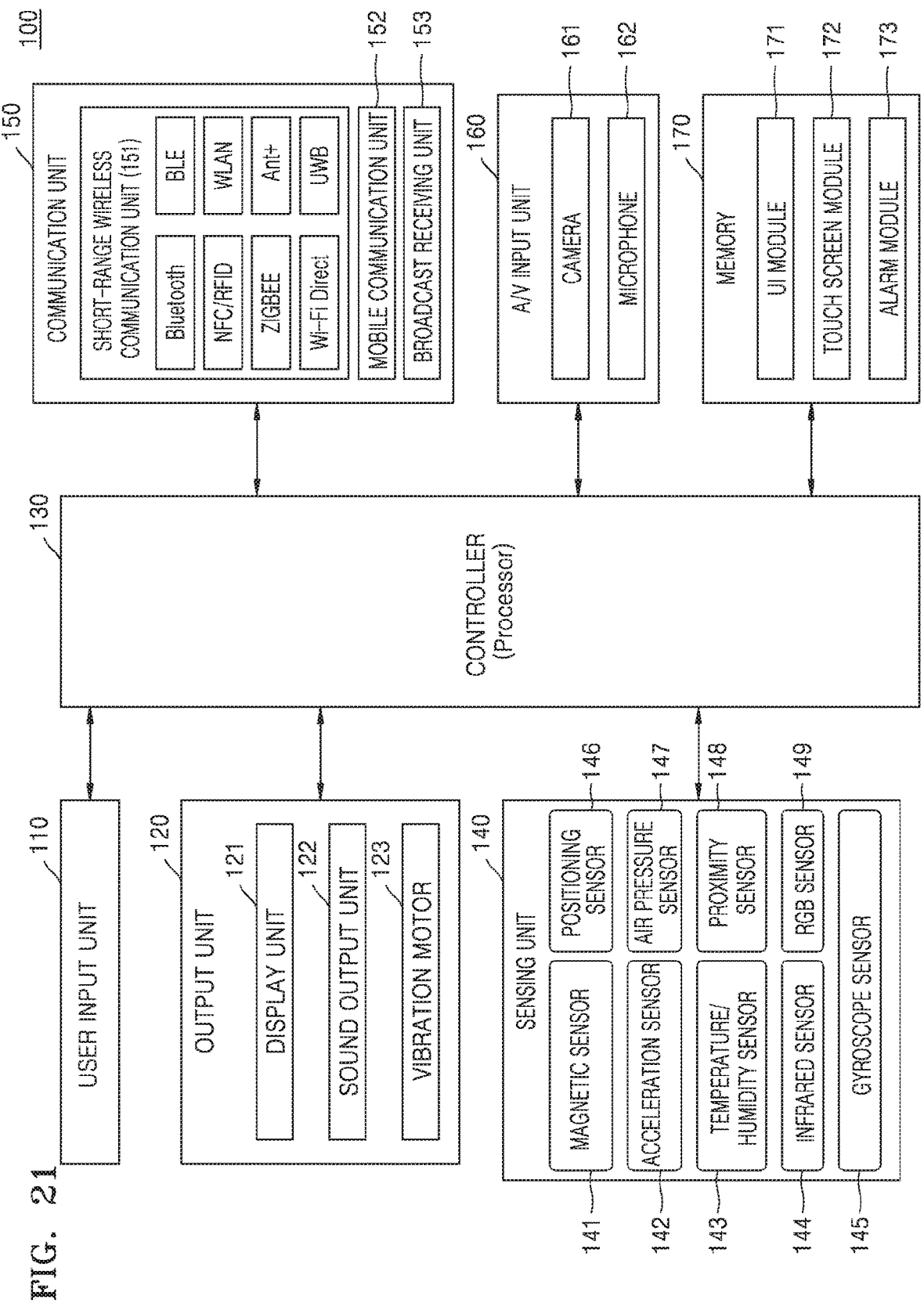
Figure 22:
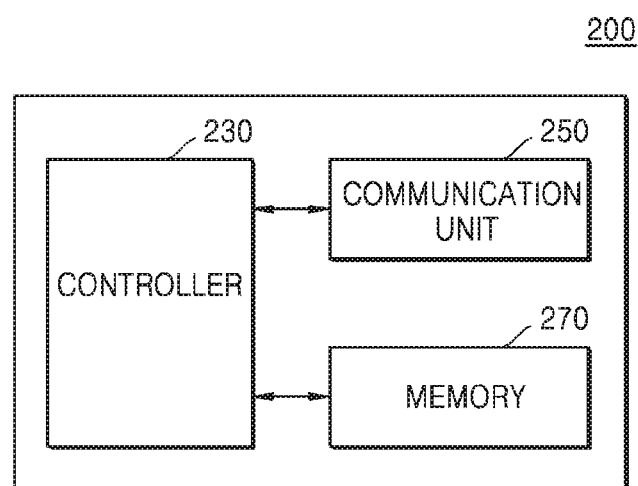

FIGS. 20 through 22 are block diagrams of the first and second devices 100 and 200 according to an embodiment of the present disclosure.

Referring to FIG. 20, the first device 100 according to an embodiment may include the processor 130 and a communication unit 150. However, not all illustrated components are essential. The first device 100 may include more or less components than those shown in FIG. 20.

Also, referring to FIG. 21, the second device 200 according to an embodiment may include a communication unit 250, the memory 270, and the processor 230. However, not all illustrated components are essential. The second device 200 may include more or less components than those shown in FIG. 21.

For example, referring to FIG. 22, the first device 100 according to an embodiment may further include the display unit 121, a sensing unit 140, a user input unit 110, an output unit 120, an audio/video (A/V) input unit 160, and a memory 170. Also, the second device 200 according to an embodiment may further include the display unit, a sensing unit, a user input unit, an output unit and an A/V input unit.

The components of the device 100 will now be described in detail.

The user input unit 110 is used by a user to input data for controlling the first device 100. Examples of the user input unit 110 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The user input unit 110 may be controlled by the processor 130 to receive a user input.

The output unit 120 is controlled by the processor 130 to output an audio signal, a video signal, or a vibration signal, and may include the display unit 121, a sound output unit 122, and a vibration motor 123.

The display unit 121 may be controlled by the processor 130 to display information processed by the first device 100.

Meanwhile, when the display unit 121 is configured as a touch screen by forming a layer structure with a touch pad, the display unit 121 may also be used as an input device as well as an output device. The display unit 121 may include at least one of a liquid crystal display (LCD), a thin-film transistor-LCD (TFT-LCD), an organic light-emitting diode (OLED), a flexible display, a three dimensional (3D) display, and an electrophoretic display. According to an embodiment of the first device 100, the first device 100 may include at least two display units 121. Here, the at least two display units 121 may be disposed to face each other by using a hinge.

The sound output unit 122 outputs audio data received from the communication unit 150 or stored in the memory 170. Also, the sound output unit 122 outputs a sound signal related to a function performed by the first device 100, such as a call signal reception sound, a message reception sound, or an alarm sound. The sound output unit 122 may include a speaker or a buzzer.

The vibration motor 123 may output a vibration signal. For example, the vibration motor 123 may output a vibration signal corresponding to an output of audio data or video data, for example, a call signal reception sound or a message reception sound. Also, the vibration motor 123 may output a vibration signal when a touch screen is touched.

The processor 130 generally controls an overall operation of the first device 100. For example, the processor 130 may generally control the user input unit 110, the output unit 120, the sensing unit 140, the communication unit 150, and the A/V input unit 160 by executing programs stored in the memory 170.

According to an embodiment, the processor 130 of the first device 100 may transmit content for executing a task to the second device 200 through the communication unit 150 according to generation of an event requesting to execute the task.

Also, the processor 130 of the first device 100 may receive result data obtained as the second device 200 executes the task through the communication unit 150.

Also, the processor 130 of the first device 100 may transmit information requesting to access certain data stored in the memory 270 of the second device 200 to the second device 200 through the communication unit 150.

Also, according to an embodiment, the processor 230 of the second device 200 may receive the content for executing the task from the first device 100 through the communication unit 150.

Also, the processor 230 of the second device 200 may execute the task in a protected region on the memory 270.

Also, the processor 230 of the second device 200 may transmit result data obtained by executing the task to the first device 100 through the communication unit 250.

Also, the processor 230 of the second device 200 may receive the information requesting to access the certain data stored in the memory 270 from the first device 100 through the communication unit 250. Also, the processor 230 may execute the task by using the certain data based on the information requesting to access the certain data.

Also, the processor 230 may encode the result data and store the encoded result data in the memory 270.

Also, when the executing of the task is completed, the processor 230 may delete data in the protected region on the memory 270.

The sensing unit 140 may detect a state of the first device 100 or a state around the first device 100, and transmit the detected state to the processor 130. The sensing unit 140 may include at least one of a magnetic sensor 141, an acceleration sensor 142, a temperature/humidity sensor 143, an infrared sensor 144, a gyroscope sensor 145, a positioning sensor 146 such as a global positioning system (GPS), an air pressure sensor 147, a proximity sensor 148, and an red, green, blue (RGB) sensor 149 such as an illuminance sensor, but a component included in the sensing unit 140 is not limited thereto. Because functions of each sensor may be intuitively inferred by one of ordinary skill in the art based on its name, details thereof are not described herein.

Also, the sensing unit 140 may include a sensor for detecting a touch input of an input tool and a sensor for detecting a touch input of a user. In this case, the sensor for detecting the touch input of the user may be included in the touch screen or the touch pad. Also, the sensor for detecting the touch input of the input tool may be disposed below the touch screen or the touch pad, or in the touch screen or the touch pad.

The communication unit 150 may include at least one component enabling the first device 100 to communicate with an external terminal or an external server. For example, the communication unit 150 may include a short-range wireless communication unit 151, a mobile communication unit 152, and a broadcast receiving unit 153.

The short-range wireless communication unit 151 may include a Bluetooth communication unit, a Bluetooth low energy (BLE) communication unit, a near field communication (NFC) unit, a wireless local area network (WLAN) (Wi-Fi) communication unit, a Zigbee communication unit, an infrared data association (IrDA) communication unit, a Wi-Fi direct (WFD) communication unit, an ultra wideband (UWB) communication unit, and an Ant+ communication unit, but components included in the short-range wireless communication unit 151 are not limited thereto.

The mobile communication unit 152 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 153 receives a broadcast signal and/or broadcast related information from an external source, through a broadcast channel. The broadcast channel may include a satellite channel or a terrestrial broadcasting channel. In some embodiments, the first device 100 may not include the broadcast receiving unit 153.

The A/V input unit 160 is used to receive an audio signal or a video signal, and may include a camera 161 and a microphone 162. The camera 161 may obtain an image frame of a still image or a moving image via an image sensor in a video telephone mode or a photographing mode. An image captured via the image sensor may be processed by the processor 130 or a separate image processor (not shown).

An image frame processed by the camera 161 may be stored in the memory 170 or transmitted to an external device through the communication unit 150. According to an embodiment of the first device 100, the first device 100 may include at least two cameras 161.

The microphone 162 receives an external sound signal and processes the external sound signal to electric voice data. For example, the microphone 162 may receive a sound signal from an external device or a narrator. The microphone 162 may use any one of various noise removing algorithms to remove noise generated while receiving the external sound signal.

The memory 170 may store a program for processes and control of the processor 130, and may store input/output data.

The memory 170 may include at least storage medium from among a flash memory, a hard disk, a multimedia card micro type memory, a card type memory (for example, a secure digital (SD) card or an extreme digital (XD) card), a random access memory (RANI), a static RAM (SRAM), a read-only memory (ROM), an electrically erasable programmable ROM (EEPROM), a programmable ROM (PROM), a magnetic memory, a magnetic disk, and an optical disk. Also, the device 100 may operate a web storage server or a cloud server that performs a storage function of the memory 170 in the Internet.

Programs stored in the memory 170 may be classified into a plurality of modules based on functions, and may be classified into a UI module 171, a touch screen module 172, and a notification module 173.

The UI module 171 may provide a specialized UI or graphical UI (GUI) linked to the first device 100 according to applications. The touch screen module 172 may detect a touch gesture of a user on a touch screen, and transmit information about the touch gesture to the processor. The touch screen module 172 according to an embodiment may recognize and analyze a touch code. The touch screen module 172 may be configured as separate hardware including a processor.

Various sensors may be disposed inside or around the touch screen to detect a touch or a proximity touch on the touch screen. An example of a sensor for detecting a touch on the touch screen includes a tactile sensor. The tactile sensor detects a contact that can be felt by a person on a certain object. The tactile sensor may detect various types of information, such as a roughness of a contact surface, a rigidity of a contact object, and a temperature of a touch point.

Another example of a sensor for detecting a touch on the touch screen includes a proximity sensor. The proximity sensor detects an existence of an object approaching or near a predetermined detection surface by using electromagnetic field force or infrared ray, without having to detect a mechanical contact. Examples of the proximity sensor include a transmission photoelectric sensor, a direct reflective type photoelectric sensor, a mirror reflective type photoelectric sensor, a high frequency oscillation proximity sensor, a capacitance type proximity sensor, a magnetic type proximity sensor, and an infrared proximity sensor. Examples of a touch gesture of a user include tap, touch and hold, double-tap, drag, panning, flick, drag-and-drop, and swipe.

The notification module 173 may generate a signal for notifying event generation in the first device 100. Examples of an event that is generated in the first device 100 include call signal reception, a message reception, key signal input, and schedule notification. The notification module 173 may output a notification signal in a video signal format through the display unit 121, in an audio signal format through the sound output unit 122, or in a vibration signal format through the vibration motor 123.

The various embodiments described herein may be applied to different various embodiments, and in addition, only some of the embodiments may be realized or a plurality of the various embodiments may be combined to be realized.

An embodiment may also be realized in a form of a non-transitory computer-readable recording medium, such as a program module executed by a computer. A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

Also, herein, a "unit" may be a hardware component such as a processor or a circuit and/or a software component executed by a hardware component such as a processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A first device requesting a second device to execute a task, the first device comprising:
    a transceiver configured to communicate with the second device; and
    at least one processor configured to:
        receive an event at the first device for requesting execution of a task which is executable by the first device,
        transmit at least one of an application execution file or link information for executing the task to the second device through the transceiver in response to receiving the event,
        request the second device to execute the task instead of the first device in a protected region on a memory of the second device based on the at least one of the application execution file or the link information, and
        receive result data comprising information about a result generated by executing the task, through the transceiver,
    wherein if the at least one of the application execution file or the link information is defective, the received result data includes information that the at least one of the application execution file or the link information is defective,
    wherein the task is restricted from access to regions other than the protected region while being executed by the second device,
    wherein when the executing of the task in the protected region on the memory is completed, data in the protected region is deleted, and
    wherein the task is to execute a diagnosis application based on limited access to private biometric information stored in the second device.

2. The first device of claim 1, wherein the event comprises at least one of a request to execute an application, reception of link information, or a request to access a data file stored in an external terminal.

3. The first device of claim 1,
    wherein the task executes in a protected region on the memory of the second device, and
    wherein the task is restricted from access to regions other than the protected region while being executed.

4. The first device of claim 1, wherein the result data comprises at least one of information about whether the at least one of the application execution file or the link information is defective or information about a result generated when the task is executed.

5. A second device requested by a first device to execute a task which is executable by the first device, the second device comprising:
    a transceiver configured to communicate with the first device; and
    at least one processor configured to:
        receive at least one of an application execution file or link information for requesting to execute the task instead of the first device in a protected region on a memory of the second device from the first device through the transceiver,
        execute the task in the protected region on the memory,
        wherein the task is restricted from access to regions other than the protected region while being executed, and
        transmit result data comprising information about a result generated by executing the task, to the first device,
    wherein if the at least one of the application execution file or the link information is defective, the transmitted result data includes information that the at least one of the application execution file or the link information is defective,
    wherein when the executing of the task in the protected region on the memory is completed, data in the protected region is deleted, and
    wherein the task is to execute a diagnosis application based on limited access to private biometric information stored in the second device.

6. The second device of claim 5, wherein the at least one processor is further configured to execute the task by using a data file based on the information requesting to access data.

7. The second device of claim 5, wherein the at least one processor is further configured to:
    encrypt the result data, and
    store the encrypted result data in the memory.

8. The second device of claim 5, wherein, when the executing of the task is completed, the at least one processor is further configured to delete data from the protected region.

9. A method of executing a task, the method comprising:
    receiving, at a first device, an event for requesting execution of the task which is executable by the first device;
    transmitting, by the first device, at least one of an application execution file or link information for executing the task to a second device in response to the event;
    requesting the second device to execute the task instead of the first device in a protected region on a memory of the second device based on the at least one of the application execution file or the link information; and
    receiving result data comprising information about a result generated by executing the task,
    wherein if the at least one of the application execution file or the link information is defective, the result data includes information that the at least one of the application execution file or the link information is defective,
    wherein the task is restricted from access to regions other than the protected region while being executed by the second device, wherein when the executing of the task in the protected region on the memory is completed, data in the protected region is deleted, and wherein the task is to execute a diagnosis application based on limited access to private biometric information stored in the second device.

10. The method of claim 9, wherein the event comprises at least one of a request to execute an application, reception of link information, or a request to access a data file stored in an external terminal.

11. The method of claim 9, wherein the result data comprises at least one of information about whether the at least one of the application execution file or the link information for executing the task is defective or information about a result generated when the task is executed.

12. The method of claim 9, wherein the executing of the task comprises executing the task by using a data file based on the access request information.

13. The method of claim 9, wherein the second device encrypts the result data and stores the encrypted result data in the memory.

* * * * *